US012613441B2

(12) United States Patent
Wei et al.

(10) Patent No.: US 12,613,441 B2
(45) Date of Patent: Apr. 28, 2026

(54) BACKLIGHT MODULE AND LIQUID CRYSTAL DISPLAY DEVICE

(71) Applicant: Wuhan China Star Optoelectronics Technology Co., Ltd., Wuhan (CN)

(72) Inventors: Qi Wei, Wuhan (CN); Fancheng Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 326 days.

(21) Appl. No.: 17/635,038

(22) PCT Filed: Jan. 20, 2022

(86) PCT No.: PCT/CN2022/072957
§ 371 (c)(1),
(2) Date: Aug. 26, 2024

(87) PCT Pub. No.: WO2023/133918
PCT Pub. Date: Jul. 20, 2023

(65) Prior Publication Data
US 2025/0341744 A1 Nov. 6, 2025

(30) Foreign Application Priority Data
Jan. 13, 2022 (CN) .......................... 202210036934.5

(51) Int. Cl.
*G02F 1/13357* (2006.01)
*G02F 1/1335* (2006.01)

(52) U.S. Cl.
CPC .. *G02F 1/133608* (2013.01); *G02F 1/133603* (2013.01); *G02F 1/133605* (2013.01); *G02F 1/133607* (2021.01); *G02F 1/133612* (2021.01)

(58) Field of Classification Search
CPC ......... G02F 1/133608; G02F 1/133607; G02F 1/133612; G02F 1/133605;
(Continued)

(56) References Cited

U.S. PATENT DOCUMENTS

2005/0254261 A1    11/2005  Lo et al.
2009/0141210 A1*    6/2009  Cho .................. G02F 1/133603
                                                          362/555
(Continued)

FOREIGN PATENT DOCUMENTS

CN          101368706 A      2/2009
CN          203082706 U      7/2013
(Continued)

*Primary Examiner* — Erin Kryukova
(74) *Attorney, Agent, or Firm* — Menachem Nathan; Nathan & Associates

(57) ABSTRACT

A backlight module and a liquid crystal display device are provided. The backlight module includes a positioning structure disposed in one side of a flexible circuit board away from a back plate. The positioning structure is disposed outside an area corresponding to a light-emitting chip, and an anti-positioning structure is disposed in the optical film, so that the positioning structure disposed in the side of the light-emitting chip can be matched with the anti-positioning structure correspondingly. The optical film is positioned and fixed, so that the positioning of the optical film is realized and a width of a frame of the backlight module is reduced.

17 Claims, 7 Drawing Sheets

(58) Field of Classification Search
CPC .......... G02F 1/133603; G02F 2201/46; F21V 17/10; G01F 1/133608; G01F 1/133607; G01F 1/133612; G01F 1/133605; G01F 1/133603
See application file for complete search history.

(56) References Cited

U.S. PATENT DOCUMENTS

| | | | |
|---|---|---|---|
| 2011/0069509 A1 * | 3/2011 | Lin | G02B 6/0088 |
| | | | 362/613 |
| 2012/0014137 A1 | 1/2012 | Yu | |
| 2017/0090113 A1 * | 3/2017 | Yuki | G02B 6/0088 |
| 2019/0113808 A1 * | 4/2019 | Isono | G02F 1/133606 |
| 2022/0026765 A1 * | 1/2022 | Yamamoto | G02F 1/133317 |

FOREIGN PATENT DOCUMENTS

| | | | | | |
|---|---|---|---|---|---|
| CN | 102182989 B | * | 1/2014 | | G02B 6/0088 |
| CN | 103697416 A | | 4/2014 | | |
| CN | 104456310 A | * | 3/2015 | | F21V 13/12 |
| CN | 104806929 A | * | 7/2015 | | G02F 1/133608 |
| CN | 205210477 U | | 5/2016 | | |
| CN | 206162012 U | | 5/2017 | | |
| CN | 107688256 A | * | 2/2018 | | G02B 6/0088 |
| CN | 208834053 U | | 5/2019 | | |
| CN | 111338126 A | | 6/2020 | | |
| KR | 101177909 B1 | * | 8/2012 | | G02F 1/1333 |
| KR | 20190075695 A | | 7/2019 | | |
| TW | 200720766 A | | 6/2007 | | |

* cited by examiner

（a）

（b）

BACKLIGHT MODULE AND LIQUID CRYSTAL DISPLAY DEVICE

FIELD OF INVENTION

This disclosure relates to a field of display technology, and more particularly, to a backlight module and liquid crystal display device.

BACKGROUND OF INVENTION

In order to achieve regional dimming and high brightness, conventional display devices will use mini LED (mini light-emitting diode) backlight elements instead of conventional edge-lit backlight elements. Conventional edge-lit backlight element arranges grooves on a lower frame to dispose protrusions on an optical film to position the optical film. However, this design results in a larger width of a plastic frame of the lower frame of the edge-lit backlight element, and a larger frame width of the backlight module. A mini LED backlight element does not require an edge-lit light source, which can make the surrounding frame narrow, but cannot dispose the optical film. Therefore, the conventional mini LED backlight element will also use the positioning method of the edge-lit backlight element to increase the width of the plastic frame to position the optical film. However, since this method will increase the width of the plastic frame, the width of the frame of the backlight module is relatively large, and a design of narrow-frame cannot be realized.

Therefore, the conventional mini LED backlight element has a technical problem that it is necessary to increase the width of the plastic frame to position the optical film, resulting in a larger width of the frame of the backlight module.

Technical Problem

The embodiment of the disclosure provides a backlight module and a liquid crystal display device to solve the technical problem that it is necessary to increase the width of the plastic frame to position the optical film, resulting in a larger width of the frame of the backlight module.

SUMMARY OF INVENTION

Technical Solutions

In order to solve the above-mentioned problems, the technical solutions provided by this disclosure are as follows.

The disclosure provides a backlight module. The backlight module comprises:

a back plate;

a flexible circuit board disposed on one side of the back plate;

at least one light-emitting chip disposed on one side of the flexible circuit board away from the back plate; and an optical film disposed on one side of the light-emitting chip away from the flexible circuit board.

The backlight module further comprises at least one positioning structure, the positioning structure is disposed on one side of the flexible circuit board away from the back plate, and the positioning structure is disposed outside an area corresponding to the light-emitting chip, a height of the positioning structure is greater than or equal to a maximum thickness of the optical film, and an anti-positioning structure is disposed in the optical film corresponding to the positioning structure.

In some embodiments, the backlight module includes a first area, a second area, a third area and a fourth area disposed around the area corresponding to the light-emitting chip, and the positioning structure includes a first positioning structure and a second positioning structure, the first positioning structure is disposed in one of the first area, the second area, the third area and the fourth area, the second positioning structure is disposed in another one of the first area, the second area, the third area and the fourth area.

In some embodiments, the backlight module includes a first corner area at a junction of the first area and the second area, a second corner area at a junction of the first area and the third area, a third corner area at a junction of the second area and the fourth area, a fourth corner area at a junction of the third area and the fourth area, the positioning structure is disposed in at least one of the first corner area, the second corner area, the third corner area and the fourth corner area.

In some embodiments, the first positioning structure is disposed in one of the first corner area, the second corner area, the third corner area and the fourth corner area, and the second positioning structure is disposed in another one of the first corner area, the second corner area, the third corner area, and the fourth corner area.

In some embodiments, the first positioning structure is disposed in one of the first corner area, the second corner area, the third corner area and the fourth corner area, and the second positioning structure is disposed in a non-junctional area of the first area, the second area, the third area and the fourth area.

In some embodiments, the anti-positioning structure includes a first anti-positioning structure and a second anti-positioning structure, the optical film includes a prism sheet and a diffusion sheet, the first anti-positioning structure is disposed in the prism sheet, the second anti-positioning structure is disposed in the diffusion sheet, the first anti-positioning structure corresponds to the first positioning structure and the second positioning structure, the second anti-positioning structure corresponds to the second positioning structure; or the first anti-positioning structure corresponds to the first positioning structure and the second positioning structure, the second anti-positioning structure corresponds to the first positioning structure and the second positioning structure.

In some embodiments, a structure of the first positioning structure is different from a structure of the second positioning structure, and the anti-positioning structure on the optical film is arranged corresponding to at least one of the first positioning structure and the second positioning structure.

In some embodiments, the optical film includes a color conversion film, a light homogenization film, a prism sheet and a diffusion sheet, and the color conversion film is disposed between the light-emitting chip and the light homogenization film, the prism sheet is disposed in the side of the light homogenization film away from the color conversion film, and the diffusion sheet is disposed on one side of the prism sheet away from the light homogenization film, a third anti-positioning structure is disposed on the color conversion film, a fourth anti-positioning structure is disposed in the light homogenization film, a fifth anti-positioning structure is disposed in the prism sheet, and a sixth anti-positioning structure is disposed in the diffusion sheet. A height of the first positioning structure is equal to a height of the light homogenization film, and a height of the second positioning structure is greater than or equal to a height of the diffusion sheet. The third anti-positioning structure and the fourth anti-positioning structure are disposed corresponding to the first positioning structure, the fifth anti-positioning structure and the sixth anti-positioning structure are disposed corresponding to the first positioning structure and the second anti-positioning structure; or the third anti-positioning structure and the fourth anti-positioning structure are disposed corresponding to the first positioning structure and the second positioning structure, the fifth anti-positioning structure and the sixth anti-positioning structure are arranged corresponding to the first positioning structure and the second anti-positioning structure.

In some embodiments, the positioning structure includes a positioning column, and the anti-positioning structure includes a through hole corresponding to the positioning column.

In some embodiments, materials of the positioning structure include silica gel and silicon dioxide.

In some embodiments, the backlight module further includes at least one reflective structure, and the reflective structure is disposed on one side of the flexible circuit board away from the back plate, the reflective structure is disposed between the light-emitting chips, a height of the reflective structure is greater than a height of the light-emitting chip, and the height of the reflective structure is less than or equal to a minimum thickness of the optical film.

In some embodiments, an array of the reflective structures is disposed between the light-emitting chips, a difference between a height of one reflective structure at a junction of a row of reflective structures and a column of reflective structures and heights of other reflective structures ranges from 0.05 mm to 0.08 mm.

In some embodiments, the reflective structure includes a first portion disposed between the light-emitting chips and a second portion disposed outside the area corresponding to the light-emitting chip, and the second portion of the reflective structure is disposed between the positioning structures and filled with gaps between adjacent positioning structures.

Meanwhile, an embodiment of the disclosure provides a liquid crystal display device, the liquid crystal display device includes a liquid crystal display panel and a backlight module, and the backlight module includes:

a back plate;

a flexible circuit board disposed in one side of the back plate;

at least one light-emitting chip disposed in one side of the flexible circuit board away from the back plate; and an optical film disposed in one side of the light-emitting chip away from the flexible circuit board.

The backlight module further comprises at least one positioning structure, the positioning structure is disposed in one side of the flexible circuit board away from the back plate, and the positioning structure is disposed outside an area corresponding to the light-emitting chip, a height of the positioning structure is greater than or equal to a maximum thickness of the optical film, and an anti-positioning structure is disposed in the optical film corresponding to the positioning structure.

In some embodiments, the backlight module includes a first area, a second area, a third area and a fourth area disposed around the area corresponding to the light-emitting chip. The positioning structure includes a first positioning structure and a second positioning structure, the first positioning structure is disposed in one of the first area, the second area, the third area and the fourth area, the second positioning structure is disposed in another one of the first area, the second area, the third area and the fourth area.

In some embodiments, the backlight module includes a first corner area at a junction of the first area and the second area, a second corner area at a junction of the first area and the third area, a third corner area at a junction of the second area and the fourth area, a fourth corner area at a junction of the third area and the fourth area, the positioning structure is disposed in at least one of the first corner area, the second corner area, the third corner area and the fourth corner area.

In some embodiments, the first positioning structure is disposed in one of the first corner area, the second corner area, the third corner area and the fourth corner area, and the second positioning structure is disposed in another one of the first corner area, the second corner area, the third corner area, and the fourth corner area.

In some embodiments, the first positioning structure is disposed in one of the first corner area, the second corner area, the third corner area and the fourth corner area, and the second positioning structure is disposed in a non-junctional area of the first area, the second area, the third area and the fourth area.

In some embodiments, the anti-positioning structure includes a first anti-positioning structure and a second anti-positioning structure, the optical film includes a prism sheet and a diffusion sheet, the first anti-positioning structure is disposed in the prism sheet, the second anti-positioning structure is disposed in the diffusion sheet, the first anti-positioning structure corresponds to the first positioning structure and the second positioning structure, the second anti-positioning structure corresponds to the second positioning structure; or the first anti-positioning structure corresponds to the first positioning structure and the second positioning structure, the second anti-positioning structure corresponds to the first positioning structure and the second positioning structure.

In some embodiments, a structure of the first positioning structure is different from a structure of the second positioning structure, and the anti-positioning structure on the optical film is arranged corresponding to at least one of the first positioning structure and the second positioning structure.

Beneficial Effects

The disclosure provides a backlight module and a liquid crystal display device. The backlight module comprises a back plate, a flexible circuit board, at least one light-emitting chip, and an optical film. The flexible circuit board is disposed on one side of the back plate. The light-emitting chip is disposed on one side of the flexible circuit board away from the back plate. The optical film is disposed on one side of the light-emitting chip away from the flexible circuit board. The backlight module further comprises at least one positioning structure, the positioning structure is disposed on one side of the flexible circuit board away from the back plate, and the positioning structure is disposed outside an area corresponding to the light-emitting chip. A height of the positioning structure is greater than or equal to a maximum thickness of the optical film, and an anti-positioning structure is disposed in the optical film corresponding to the positioning structure. In this disclosure, the positioning structure is disposed on one side of a flexible circuit board away from a back plate. The positioning structure is arranged outside a corresponding area of the light-emitting chip, and an anti-positioning structure is disposed in the optical film. The positioning structure disposed on the side of the light-emitting chip can be matched with the anti-positioning structure, and the optical film can be positioned and fixed. In this disclosure, it is only necessary to arrange a positioning structure on the side of the light-emitting chip, without increasing the width of the frame of the backlight module, so that the positioning of the optical film is achieved and the width of the frame of the backlight module is reduced.

DESCRIPTION OF DRAWINGS

The technical solutions and other beneficial effects of the disclosure will be obvious through the detailed description of the specific embodiments of the disclosure in combination with the accompanying drawings.

DETAILED DESCRIPTION OF PREFERRED EMBODIMENTS

The technical solutions in the embodiments of the disclosure will be described clearly and completely below with reference to the drawings in the embodiments of the disclosure. Obviously, the described embodiments are only a part of the embodiments of the disclosure, but not all the embodiments. Based on the embodiments in the disclosure, all other embodiments obtained by those skilled in the art without creative efforts fall within the scope of the disclosure.

Figure 1:
FIG. 1 is a schematic diagram of a first conventional liquid crystal display device.
Figure 2:
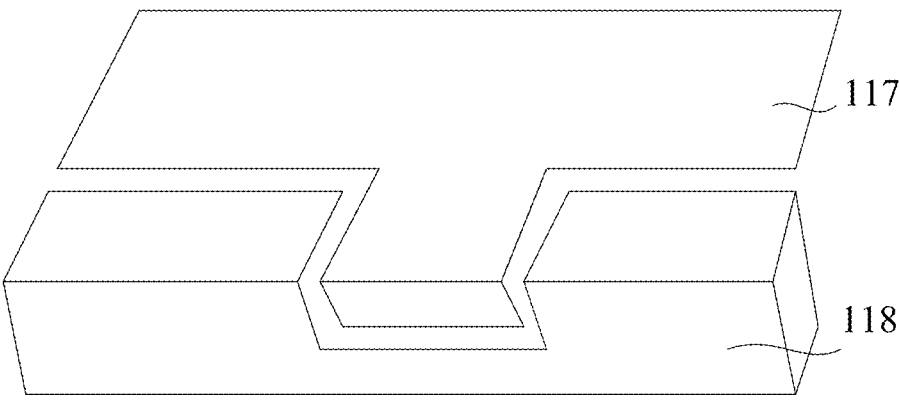
FIG. 2 is a schematic diagram of a second conventional liquid crystal display device.

Referring to FIG. 1, an edge-lit backlight module includes a back plate 111, a reflection sheet 112, a side light source 113, a light guide plate 114, a prism sheet 115, and a diffusion sheet 116. As shown in FIG. 1, since the side light source needs to be arranged, a width of a frame on one side of the backlight module needs to be increased. Referring to FIG. 2, in order to position the optical film, grooves are provided on a plastic frame 118, and protrusions are provided on the optical film 117 correspondingly to position and fix the optical film 117. Since the grooves need to be arranged on the plastic frame, the width of the plastic frame is larger, which further increases the width of the frame of the backlight module, resulting in a larger frame of the backlight module. In mini LED backlight module, in order to realize the positioning of the optical film, the positioning method of the edge-lit backlight module can only be used. Although the width of the frame is reduced compared to the edge-lit backlight module, there is still a need to increase the width of the plastic frame, which leads to a larger frame width of the backlight module, and a narrow frame cannot be realized. Therefore, the conventional mini LED backlight element has a technical problem that it is necessary to increase the width of the plastic frame for the positioning of the optical film, which results in a larger frame of the backlight module.

Figure 3:
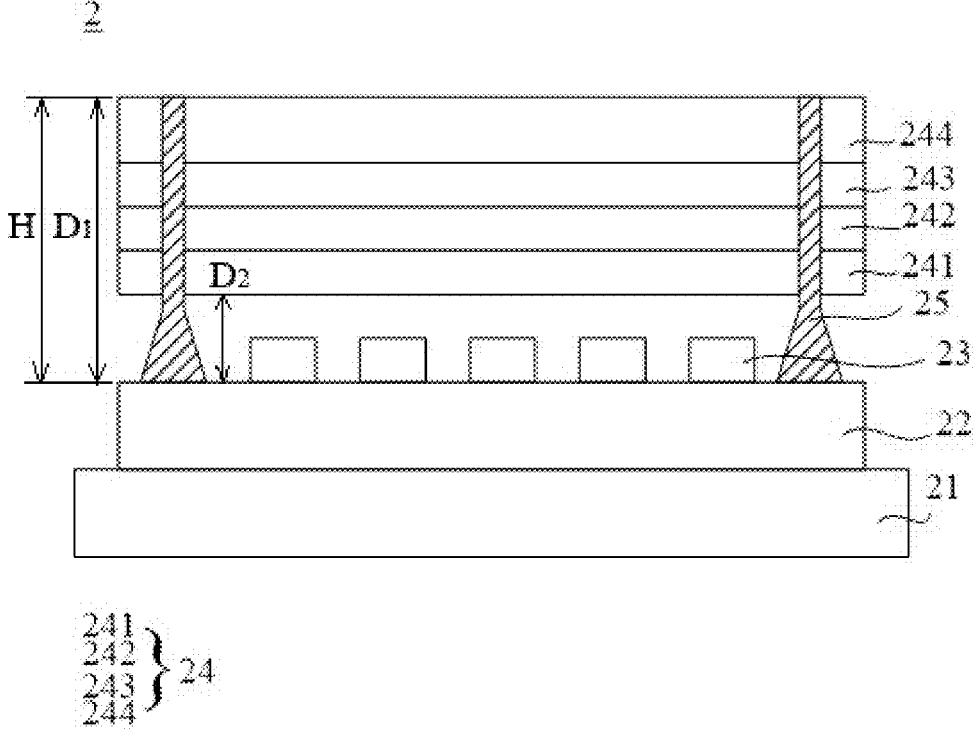
FIG. 3 is a schematic diagram of a backlight module according to a first embodiment of the disclosure.
Figure 4:
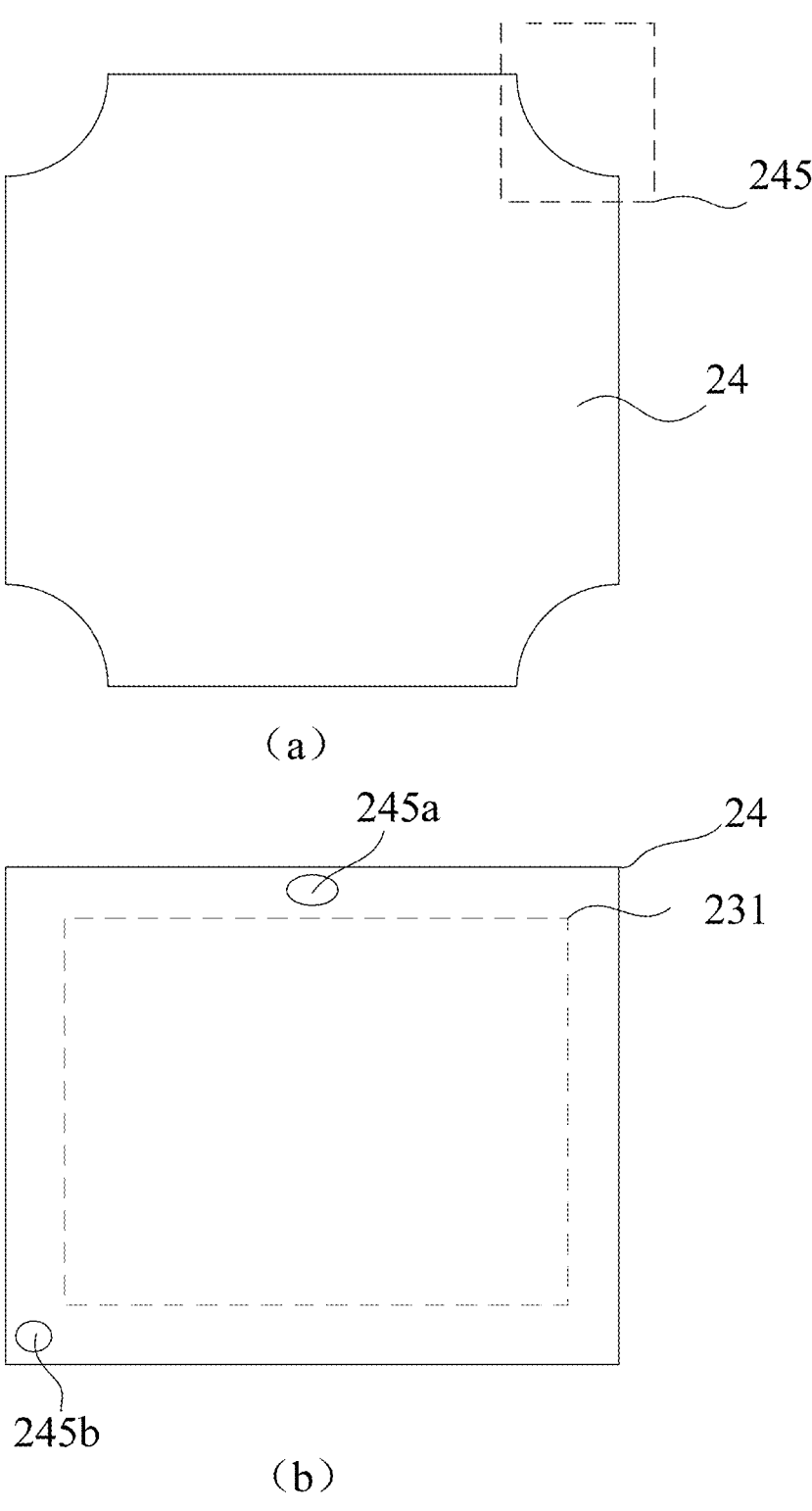
FIG. 4 is a schematic diagram of the backlight module according to a second embodiment of the disclosure.
Figure 5:
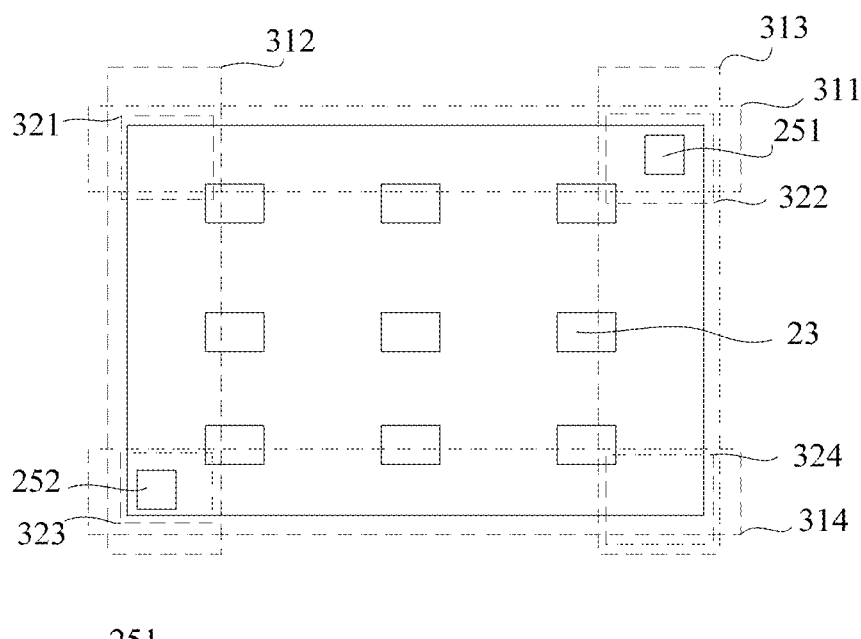
FIG. 5 is a schematic diagram of the backlight module according to a third embodiment of the disclosure.

Referring to FIGS. 3-5, the embodiment of the disclosure provides a backlight module, and the backlight module 2 includes:

a back plate 21;

a flexible circuit board 22 disposed on one side of the back plate 21;

a plurality of light-emitting chips 23 arranged in an array and disposed on one side of the flexible circuit board 22 away from the back plate 21; and an optical film 24 disposed on one side of the light-emitting chip 23 away from the flexible circuit board 22.

The backlight module 2 further comprises a plurality of positioning structures 25, the positioning structures 25 are disposed at one side of the flexible circuit board 22 away from the back plate 21, and the positioning structures 25 are disposed outside an area 231 corresponding to the light-emitting chips 23. A height H of each of the positioning structures 25 is greater than or equal to a maximum thickness D1 of the optical film 24, and a plurality of anti-positioning structures 245 are disposed in the optical film 24 corresponding to the positioning structures 25.

The embodiments of the disclosure provide a backlight module. The backlight module further comprises at least one positioning structure, the positioning structure is disposed on one side of the flexible circuit board away from the back plate, and the positioning structure is disposed outside an area corresponding to the light-emitting chip. A height of the positioning structure is greater than or equal to a maximum thickness of the optical film, and an anti-positioning structure is disposed in the optical film corresponding to the positioning structure. In this disclosure, the positioning structure is disposed on one side of a flexible circuit board away from a back plate. The positioning structure is arranged outside a corresponding area of the light-emitting chip, and an anti-positioning structure is disposed in the optical film. The positioning structure disposed on the side of the light-emitting chip can be matched with the anti-positioning structure, and the optical film can be positioned and fixed. In this disclosure, it is only necessary to arrange a positioning structure on the side of the light-emitting chip, without increasing the width of the frame of the backlight module, so that the positioning of the optical film is achieved and the width of the frame of the backlight module is reduced.

It should be noted that the height H of the positioning structure refers to the height measured from the back plate or the flexible circuit board, which serves as the reference plane. The maximum thickness D1 of the optical film refers to the maximum height measured from the reference plane to the surface of the film layer that is farthest from the back plate. The minimum thickness D2 of the optical film refers to the minimum height measured from the reference plane to the surface of the film layer that is closest to the back plate. For example, in FIG. 3, the height of the positioning structure 25 refers to a distance from an upper surface of the flexible circuit board 22 to an upper surface of the diffusion sheet 244. The minimum thickness of the optical film 24 refers to the distance between the upper surface of the flexible circuit board 22 and the lower surface of the color conversion film 241. It will not be repeated in the following embodiments.

It should be noted that in FIG. 4, as shown in (a) of FIG. 4, when the positioning structures are arranged in the four corner areas, the anti-positioning structures 245 are also correspondingly arranged in the four corner areas of the optical film. As shown in (b) of FIG. 4, when the positioning structures are disposed in different areas, the anti-positioning structure 245 also includes a first anti-positioning structure 245*a* and a second anti-positioning structure 245*b*, which are correspondingly disposed in positions of the positioning structures for positioning and fixing. In one embodiment, the positioning structure includes one positioning structure. By arranging one positioning structure, the positioning structure corresponds with the anti-positioning structure, the optical film is positioned.

It should be noted that, the positioning structure is formed on the periphery of the light-emitting chip, which can prevent that when the positioning structure is arranged between the light-emitting chips, there is no light at the corresponding area of the positioning structure, resulting in the problem of dark spots in the display device.

For the problem that a single positioning structure cannot be accurately positioned, in one embodiment, the positioning structure includes a first positioning structure and a second positioning structure. By arranging the first positioning structure and the second positioning structure, at least two positioning structures correspond with the anti-positioning structures on the optical film to improve the positioning and fixing effect of the optical film.

For the problem that a single positioning structure cannot be accurately positioned, in one embodiment, as shown in FIG. 5, the backlight module includes a first area 311, a second area 312, a third area 313 and a fourth area 314 located around an area corresponding to the light-emitting chip 23.

The positioning structure 25 includes a first positioning structure 251 and a second positioning structure 252. The first positioning structure 251 is disposed in one of the first area 311, the second area 312, the third area 313 and the fourth areas 314, the second positioning structure 252 is disposed in another one of the first area 311, the second area 312, the third area 313 and the fourth area 314. The positioning structure includes the first positioning structure and the second positioning structure, and the first positioning structure and the second positioning structure are arranged in at least two areas, so that the optical film can be positioned by positioning structures in different directions, without increasing the width of the frame of the backlight module, and the positioning effect is better than the positioning structures arranged on the same side.

It should be noted that, taking FIG. 5 as an example, an overlapping portion is between the first area 311, the second area 312, the third area 313 and the fourth area 314. For example, the first area 311 and the second area 312 comprise an overlapping portion, that is, a first corner area 321. Thus, both the first area and the second area include the first corner area, or the first area includes the first corner area and the second area does not include the first corner area.

According to the above description, it can be seen that when the first positioning structure is disposed in one of the first area, the second area, the third area and the fourth area, and the second positioning structure is disposed in another of the first area, the second area, the third area and the fourth area, there will be a state that the first positioning structure and the second positioning structure are disposed in the overlapping portion of the two areas, a state that the first positioning structure is disposed in the overlapping portion of the two areas, and the second positioning structure is disposed in one of the two areas, or a state that the first positioning structure and the second positioning structure are disposed in a non-junctional area of the two areas. Although the first positioning structure and the second positioning structure are not disposed in the two sides, since the positioning effect can still be improved by the multiple positioning structures at this time, this embodiment is also the protection scope of the disclosure, and will not be repeated herein.

When the positioning structure is disposed in the side, the volume of the positioning structure is small and affects the performance of the optical film. In one embodiment, as shown in FIG. 5, the backlight module includes a first corner area 321 at a junction of the first area 311 and the second area 312, a second corner area 322 at a junction of the first area 311 and the third area 313, a third corner area 323 at a junction of the second area 312 and the fourth area 314, and a fourth corner area 324 at a junction of the third area 313 and the fourth area 314. The positioning structure 25 is disposed in at least one of the first corner area 321, the second corner area 322, the third corner area 323 and the fourth corner area 324. The positioning structure is arranged in at least one of the first corner area, the second corner area, the third corner area, and the fourth corner area of the backlight module, and the positioning structure is arranged on the corner of the backlight module, the volume of the positioning structure can be correspondingly increased to prevent the positioning structure from fracture and inaccurate positioning caused by the volume of the positioning structure being too small. The anti-positioning structure of the optical film can also be arranged on the corner correspondingly. Since the light is mainly emitted from the area corresponding to the light-emitting chip, the influence on the optical film and the light-emitting effect is reduced.

In one embodiment, as shown in FIG. 5, the first positioning structure 251 is disposed in one of the first corner area 321, the second corner area 322, the third corner area 323 and the fourth corner area 324, and the second positioning structure 252 is disposed in another one of the first corner area 321, the second corner area 322, the third corner area 323 and the fourth corner area 324. The first positioning structure and the second positioning structure are arranged in the corner area, so that when the optical film is attached to the light-emitting chip, the optical film can be positioned and fixed by the positioning structure and the anti-positioning structure in the corner area. The width of the frame of the backlight module does not need to be increased, and it is not necessary to form an anti-positioning structure on the area of the optical film corresponding to the light-emitting area, so that the integrity of the optical film is improved, and the light is processed.

Specifically, the first positioning structure and the second positioning structure are disposed in the corner areas of the same side of the backlight module. For example, the first corner area and the second corner area are corner areas on the same side. The first positioning structure and the second positioning structure are disposed in the same side, so that when the optical film is bonded to the light-emitting chip, the optical film is positioned and attached from the side provided with the positioning structure to realize the positioning and fixing of the optical film.

Specifically, the first positioning structure and the second positioning structure are disposed in the corner areas of the diagonal side of the backlight module. For example, the first corner area and the third corner area are corner areas on the diagonal side. The first positioning structure and the second positioning structure are arranged diagonally. Firstly, during the bonding of the optical film, the positioning structure can be held and positioned from the upper side, front side, rear side, left side or right side. Secondly, the positioning structure can be disposed diagonally to stably fix the optical film.

Figure 6:
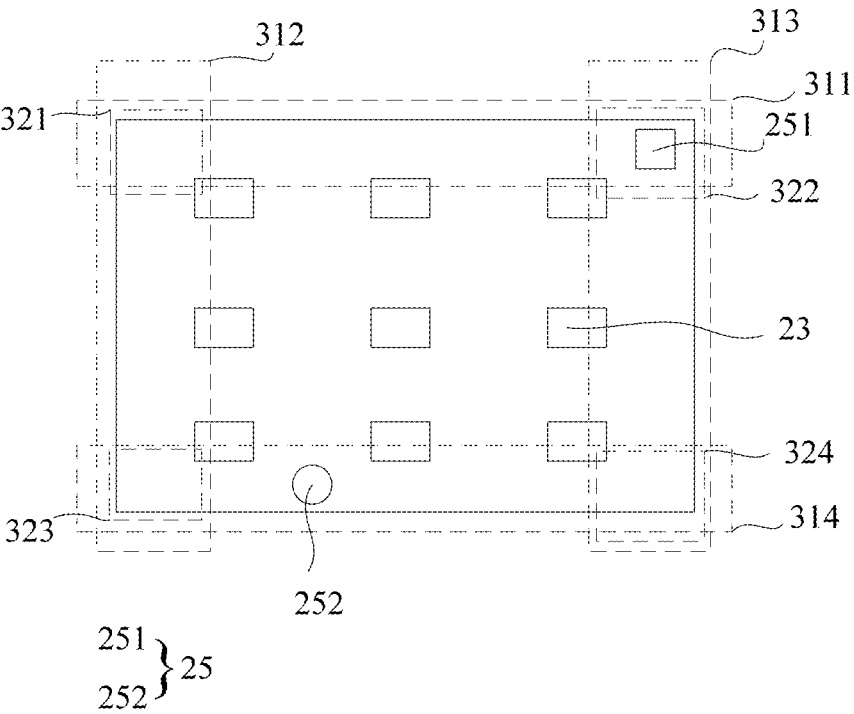
FIG. 6 is a schematic diagram of the backlight module according to a fourth embodiment of the disclosure.

In one embodiment, as shown in FIG. 6, the first positioning structure 251 is disposed in one of the first corner area 321, the second corner area 322, the third corner area 323 and the fourth corner region 324, and the second positioning structure 252 is disposed in a non-junctional area of the first area 311, the second area 312, the third area 313 and the fourth area 314. The positioning structures are respectively disposed in the corner area and the non-junctional area of each side. The positioning structures of the multiple areas position the optical film from multiple angles, and it is not necessary to increase the width of the frame of the backlight module for positioning, so as to improve the accuracy of positioning and the stability of fixation.

Figure 7:
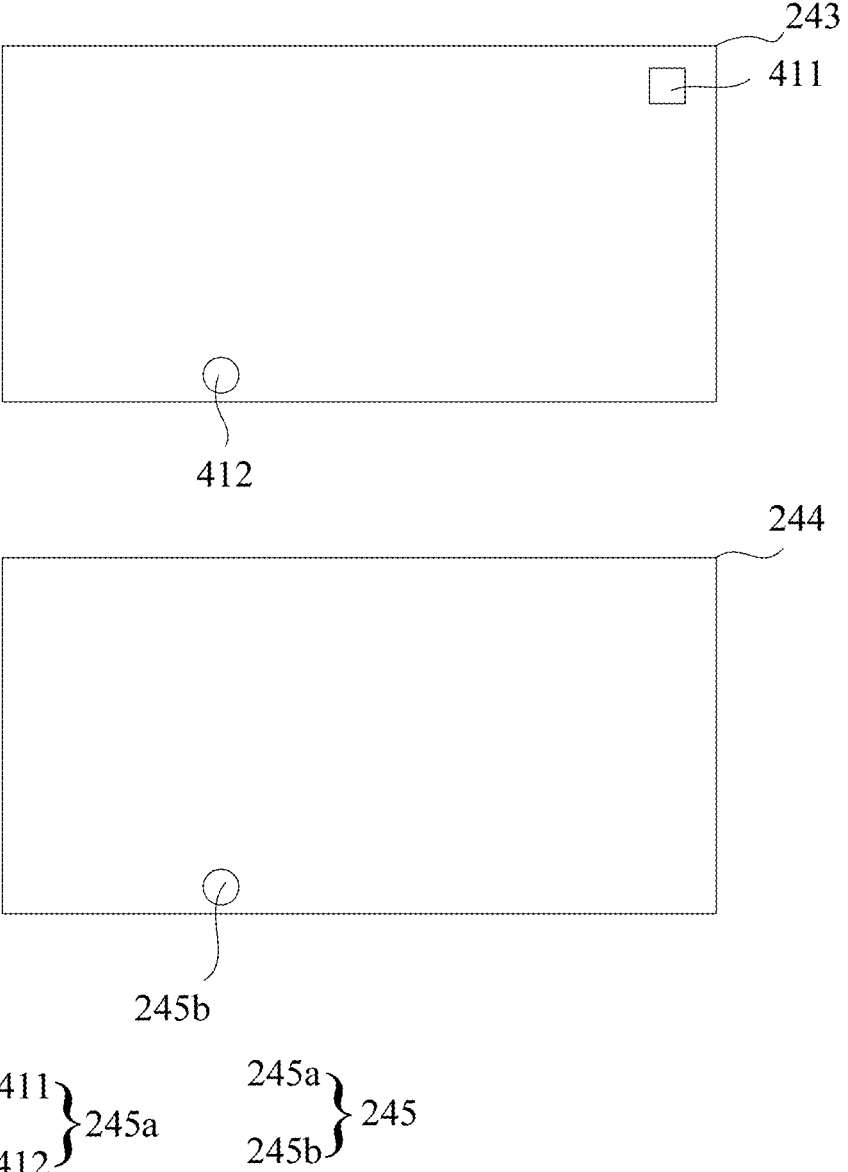
FIG. 7 is a schematic diagram of the backlight module according to a fifth embodiment of the disclosure.

In one embodiment, as shown in FIG. 7, The anti-positioning structure 245 includes a first anti-positioning structure 245*a* and a second anti-positioning structure 245*b*. The optical film 24 includes a prism sheet 243 and a diffusion sheet 244. The prism sheet 243 is provided with a first anti-positioning structure 245*a*, and the diffusion sheet 244 is provided with a second anti-positioning structure 245*b*. The first anti-positioning structure 245*a* corresponds to the first positioning structure 251 and the second positioning structure 252, and the second anti-positioning structure 245*b* corresponds to the second positioning structure 252. Alternatively, the first anti-positioning structure corresponds to the first positioning structure and the second positioning structure, and the second anti-positioning structure corresponds to the first positioning structure and the second positioning structure. When the first anti-positioning structure and the second anti-positioning structure are arranged, different optical films can be correspondingly arranged with the positioning structures at different positions, so as to improve the alignment accuracy of the optical film and the light-emitting chip.

Specifically, referring to FIG. 7, the first anti-positioning structure 245*a* includes a first portion 411 corresponding to the first positioning structure 251 and a second portion 412 corresponding to the second positioning structure 252. By arranging different structures to match with different positioning structures, the alignment accuracy and fixing stability of the optical film are improved.

Specifically, when the positioning structures are arranged, some films can be disposed corresponding to all positioning structures, and some films can be disposed corresponding to some positioning structures. For example, as shown in FIG. 7, the diffusion sheet is only provided with a second anti-positioning structure corresponding to the second positioning structure as an example. However, the embodiment of the disclosure is not limited thereto. For example, the second anti-positioning structure may also be disposed corresponding to a plurality of positioning structures, and the first anti-positioning structure may be disposed corresponding to a plurality of positioning structures.

In one embodiment, as shown in FIG. 6 and FIG. 7, the structures of the first positioning structure 251 and the second positioning structure 252 are different. The anti-positioning structure 245 on the optical film 24 is disposed corresponding to at least one of the first positioning structure 251 and the second positioning structure 252. The positioning structures with different structures are matched with the anti-positioning structures with different structures to improve the alignment effect of the positioning structure and improve the stability of the positioning structure.

In one embodiment, as shown in FIG. 3, the optical film 24 includes a color conversion film 241, a light homogenization film 242, a prism sheet 243 and a diffusion sheet 244. The color conversion film 241 is disposed between the light-emitting chip 23 and the light homogenization film 242, the prism sheet 243 is disposed in one side of the light homogenization film 242 away from the color conversion film 241, and the diffusion sheet 244 is disposed in one side of the prism sheet 243 away from the light homogenization film 242. The color conversion film is provided with a third anti-positioning structure, the light homogenization film is provided with a fourth anti-positioning structure, the prism sheet is provided with a fifth anti-positioning structure, and the diffusion sheet is provided with a sixth anti-positioning structure.

A height of the first positioning structure is equal to a height of the light homogenization film, and a height of the second positioning structure is greater than or equal to the height of the diffusion sheet.

The third anti-positioning structure and the fourth anti-positioning structure are arranged corresponding to the first positioning structure. The fifth anti-positioning structure and the sixth anti-positioning structure are arranged corresponding to the first positioning structure and the second anti-positioning structure. Alternatively, the third anti-positioning structure and the fourth anti-positioning structure are arranged corresponding to the first positioning structure and the second positioning structure, and the fifth anti-positioning structure and the sixth anti-positioning structure are arranged corresponding to the first positioning structure and the second anti-positioning structure. Positioning structures with different shapes and heights are disposed, so that different optical films can be disposed with different anti-positioning structures. The anti-positioning structure can be matched with the positioning structures with different heights and shapes. Different positioning structures realize the positioning of the optical film without increasing the width of the frame of the backlight module, and the stability of the positioning and fixing of the optical film is improved through the design of different positioning structures.

In one embodiment, the positioning structure includes a positioning column, and the anti-positioning structure includes a through hole corresponding to the positioning column. The positioning column is disposed in the corresponding side of the light-emitting chip, and the through hole is disposed in the optical film, so that when the optical film is matched with the light-emitting chip, the through hole on the optical film can be matched with the positioning column, and the optical film can be fully attached. The optical film and the light-emitting chip can be accurately positioned and fixed without increasing the width of the frame of the backplane module.

Specifically, as shown in FIG. 3, a cross-sectional shape of the positioning structure can be conical, and it can be disposed in a manner of a circular truncated cone and a circular column. A circular hole is disposed in the optical film. Since there are no edges and corners in the circular column and the circular hole, scuffing and scratches on the optical film or positioning structure can be avoided, and the loss of light can be prevented. However, the embodiments of the disclosure are not limited thereto, for example, the positioning structure may be a cuboid, a cylinder, a prism and a cuboid, etc., which will not be repeated herein.

In one embodiment, the positioning structure includes a positioning column, the positioning column is provided with a via hole, and the anti-positioning structure includes a protrusion matched with the via hole. It is considered that the problem of light loss caused by the formation of vias in the optical film, the protrusion is formed on the optical film to avoid the loss of light. The positioning column will not extend beyond the optical film, and the optical film and the positioning structure are closely matched.

Specifically, the prism sheet in the optical film is provided with the via hole, and the diffusion sheet is provided with the protrusion. In the process of matching the optical film and the positioning structure, after the positioning structure passes through the via hole of the prism sheet, the via hole on the positioning column corresponds to the protrusion on the diffusion sheet, so as to complete the positioning of the optical film. It can be prevented that the diffusion sheet disposed in the outside cannot be arranged on the entire surface to process the light.

The positioning structure is disposed in the edge of the light-emitting chip and will absorb light. In one embodiment, materials of the positioning column include silica gel and titanium dioxide. Silica gel and titanium dioxide are used to form the positioning structure, which can form a white positioning structure and improve the reflection effect of light. When the light is emitted to the positioning structure, the light will be reflected, thereby improving the forward brightness and avoiding the loss of light.

In one embodiment, the positioning structure includes a reflective layer, and the reflective layer is disposed in one side in contact with the anti-positioning structure. The reflective layer is arranged in the positioning structure, so that when the light is irradiated on the positioning structure, the light can be reflected by the reflective layer to prevent the loss of light. Moreover, the reflected light will pass through each of the optical films, so that the optical films can process the light, such as angle adjustment.

It should be noted that in the above embodiments, the positioning structure including the first positioning structure and the second positioning structure is described in detail as an example, but the embodiments of the disclosure are not limited thereto. For example, the positioning structure can include a plurality of positioning structures disposed around, and the shape, size and height of each positioning structure can be set according to requirements. Specifically, similar configuration may be arranged in the manner of disposing the first positioning structure and the second positioning structure, which will not be repeated in this embodiment of the disclosure.

Figure 8:
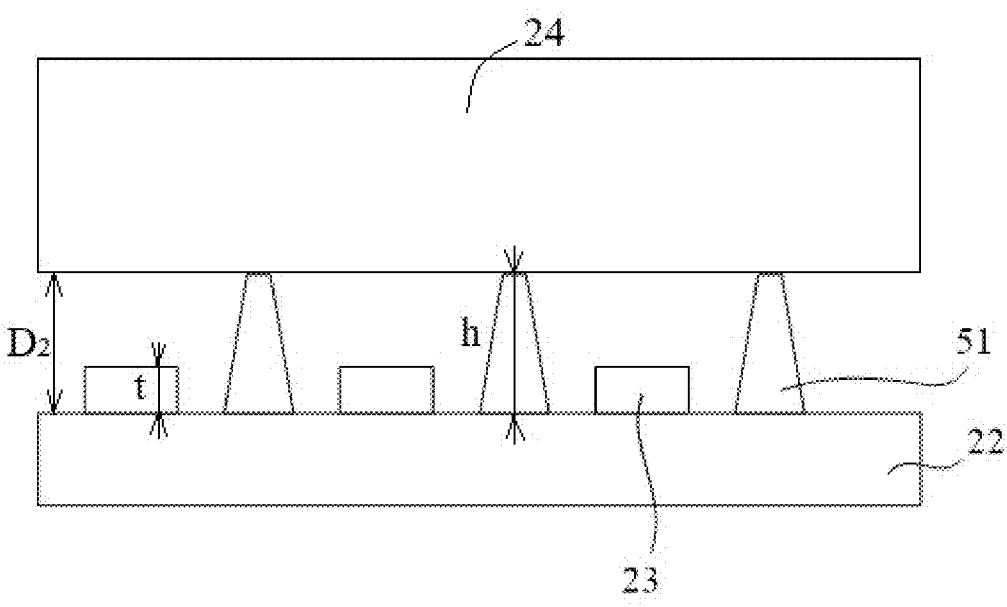
FIG. 8 is a schematic diagram of the backlight module according to a sixth embodiment of the disclosure.

When the light is emitted outward, there will be some light that cannot be emitted. In one embodiment, as shown in FIG. 8, the backlight module further includes at least one reflective structure 51, and the reflective structure 51 is disposed on one side of the flexible circuit board 22 away from the back plate. The reflective structure 51 is disposed between the light-emitting chips 23, a height h of the reflective structure 51 is greater than a height t of the light-emitting chip 23, and the height h of the reflective structure 51 is less than or equal to a minimum thickness D2 of the optical film. The reflective structure is disposed between the light-emitting chips, so that when the light is emitted to both sides, the light can be reflected by the reflective structure, so that the light can be radiated to the outside, and the loss of light can be prevented.

In one embodiment, an array of the reflective structures is disposed between the light-emitting chips, a difference between a height of one reflective structure at a junction area of a row of reflective structures and a column of reflective structures and heights of other reflective structures ranges from 0.05 mm to 0.08 mm. The height of the reflective structure in the junction area is similar to or even equal to that of the reflective structure at other positions, so as to prevent the reflective structure from damaging the optical film, and to prevent that the angle of the light controlled by the reflective structure is different from a preset controlling angle, resulting in the loss of light or the problem of uneven light.

Specifically, when forming the reflective structure, control the eject volume ejected by nozzles at the junction area. After the horizontal reflective structures are formed, when the vertical reflective structures are formed, the nozzles are controlled not to eject or to reduce the eject volume at the junction area, so that the height of the reflective structure at the junction area is similar to or even equal to that of the reflective structure at other positions. This can prevent the reflective structure from damaging the optical film, and can prevent the angle of the light controlled by the reflective structure is different from a preset controlling angle, resulting in the loss of light or the problem of uneven light.

Figure 9:
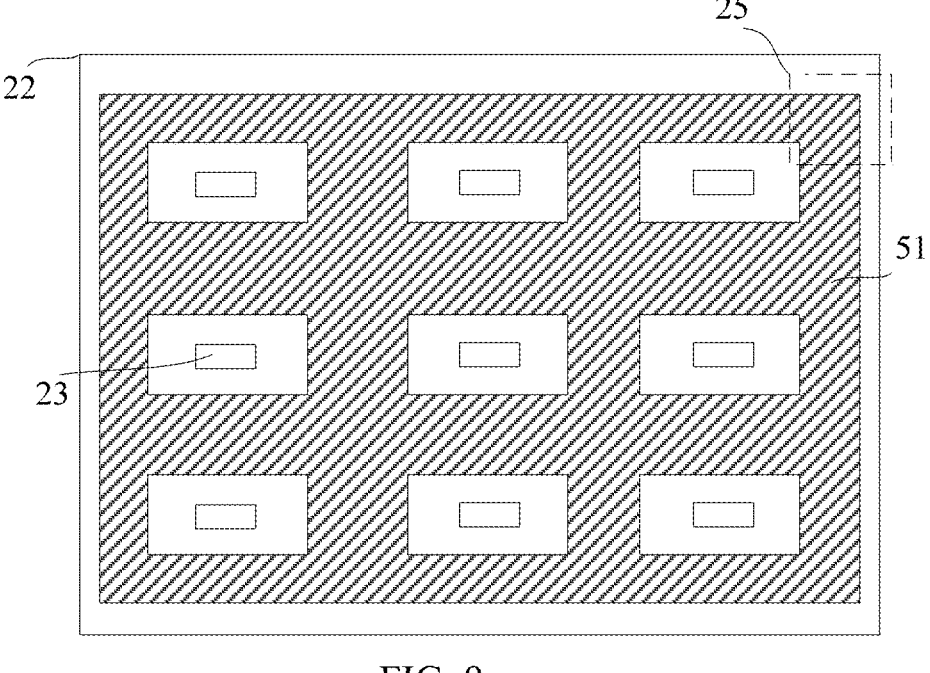
FIG. 9 is a schematic diagram of the backlight module according to a seventh embodiment of the disclosure.

In one embodiment, as shown in FIG. 9, the reflective structure 51 includes a first portion disposed between the light-emitting chips 23 and a second part disposed outside the corresponding area of the light-emitting chips 23, and the second portion of the reflective structure 51 is disposed between the positioning structures 25 and filled with gaps between adjacent positioning structures 25. The reflective structure is filled with the positioning structure, the reflective structure or the positioning structure is disposed around the periphery of the light-emitting chip, the light can be reflected by the reflective structure or the positioning structure when the light is diffused to the outside of the backlight module, so as to prevent the loss of the light.

Specifically, as shown in FIG. 9, taking the reflective structure 51 and the positioning structure 25 formed of the same structure or the same material as an example, it can be seen that the reflective structure 51 and the positioning structure 25 are arranged around the light-emitting chip. Specifically, the reflective structures 51 are arranged between and around the light-emitting chips 23, and the positioning structures 25 are arranged at the periphery of the light-emitting chip, so that the light emitted by the light-emitting chip will be reflected by the reflective structures and the positioning columns, thereby improving the utilization rate of light and preventing the loss of light.

In one embodiment, the reflective structure includes a substrate and a reflective layer, and the reflective layer is disposed around the substrate. The substrate and the reflective layer are disposed so that when the light is irradiated on the reflective structure, the light will be reflected by the reflective layer to prevent the loss of the light.

In one embodiment, the material of the reflective structure is the same as the material of the positioning structure. The reflective structure and the positioning structure are formed by the same material. When the light is irradiated on the reflective structure and the positioning structure, the light can be reflected to prevent the loss of the light. The reflective structure and the positioning structure are made of the same material to improve the preparation efficiency of the backlight module.

Specifically, the material of the reflective structure includes silica gel and titanium dioxide. The reflective structure and the positioning structure are formed by the same material. When the positioning structure and the reflection structure are formed, the angle of the emitted light can be easily controlled, and the manufacturing efficiency of the backlight module can be improved.

It should be noted that in the above embodiment, the optical diaphragm includes a color conversion film, a light homogenization film, a prism sheet and a diffusion sheet as an example. However, the embodiment of the disclosure is not limited thereto. For example, a fluorescent film is disposed in the light-emitting chip to convert different colors of light. In this embodiment, the color conversion film cannot be provided, which will not be repeated in the embodiments of the disclosure.

Figure 10:
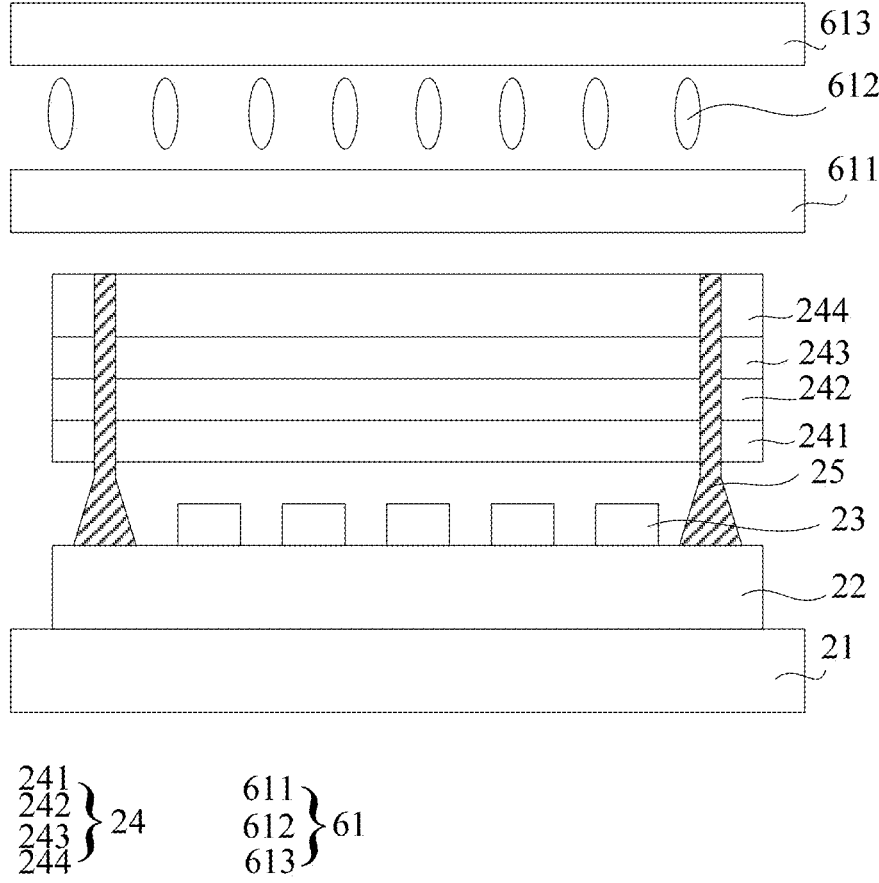
FIG. 10 is a schematic diagram of a liquid crystal display device according to an embodiment of the disclosure.

Meanwhile, as shown in FIG. 4, FIG. 5, and FIG. 10, an embodiment of the disclosure provides a liquid crystal display device. The liquid crystal display device includes a liquid crystal display panel 61 and a backlight module. The backlight module includes:

a back plate 21;

a flexible circuit board 22 disposed on one side of the back plate 21;

a plurality of light-emitting chips 23 arranged in an array and disposed on one side of the flexible circuit board 22 away from the back plate 21; and an optical film 24 disposed on one side of the light-emitting chip 23 away from the flexible circuit board 22.

The backlight module 2 further comprises a plurality of positioning structures 25, the positioning structures 25 are disposed at one side of the flexible circuit board 22 away from the back plate 21, and the positioning structures 25 are disposed outside an area 231 corresponding to the light-emitting chips 23. A height H of each of the positioning structures 25 is greater than or equal to a maximum thickness D1 of the optical film 24, and a plurality of anti-positioning structures 245 are disposed in the optical film 24 corresponding to the positioning structures 25.

An embodiment of the disclosure provides a liquid crystal display device, the liquid crystal display device includes a liquid crystal display panel and a backlight module. The backlight module further comprises at least one positioning structure, the positioning structure is disposed on one side of the flexible circuit board away from the back plate, and the positioning structure is disposed outside an area corresponding to the light-emitting chip. A height of the positioning structure is greater than or equal to a maximum thickness of the optical film, and an anti-positioning structure is disposed in the optical film corresponding to the positioning structure. In this disclosure, the positioning structure is disposed on one side of a flexible circuit board away from a back plate. The positioning structure is arranged outside a corresponding area of the light-emitting chip, and an anti-positioning structure is disposed in the optical film. The positioning structure disposed on the side of the light-emitting chip can be matched with the anti-positioning structure, and the optical film can be positioned and fixed. In this disclosure, it is only necessary to arrange a positioning structure on the side of the light-emitting chip, without increasing the width of the frame of the backlight module, so that the positioning of the optical film is achieved and the width of the frame of the backlight module is reduced.

In one embodiment, the liquid crystal display panel 61 includes a first substrate 611, a second substrate 613 and a liquid crystal layer 612 disposed between the first substrate 611 and the second substrate 613.

In one embodiment, in the liquid crystal display device, the backlight module includes a first area, a second area, a third area and a fourth area disposed around a corresponding area of the light-emitting chip.

The positioning structure includes a first positioning structure and a second positioning structure, the first positioning structure is disposed in one of the first area, the second area, the third area and the fourth area, the second positioning structure is disposed in another one of the first area, the second area, the third area and the fourth area.

In one embodiment, in the liquid crystal display device, the backlight module comprises a first corner area at a junction of the first area and the second area, a second corner area at a junction of the first area and the third area, a third corner area at a junction of the second area and the fourth area, and a fourth corner area at the junction of the third area and the fourth area. The positioning structure is disposed in at least one of the first corner area, the second corner area, the third corner area and the fourth corner area.

In one embodiment, in the liquid crystal display device, the first positioning structure is disposed in one of the first corner area, the second corner area, the third corner area and the fourth corner area, and the second positioning structure is disposed in another one of the first corner area, the second corner area, the third corner area, and the fourth corner area.

In one embodiment, in the liquid crystal display device, the first positioning structure is disposed in one of the first corner area, the second corner area, the third corner area and the fourth corner area, and the second positioning structure is disposed in a non-junctional area of the first area, the second area, the third area and the fourth area.

In one embodiment, in the liquid crystal display device, the anti-positioning structure includes a first anti-positioning structure and a second anti-positioning structure, the optical film includes a prism sheet and a diffusion sheet, the first anti-positioning structure is disposed in the prism sheet, the second anti-positioning structure is disposed in the diffusion sheet, the first anti-positioning structure corresponds to the first positioning structure and the second positioning structure, the second anti-positioning structure corresponds to the second positioning structure; or the first anti-positioning structure corresponds to the first positioning structure and the second positioning structure, the second anti-positioning structure corresponds to the first positioning structure and the second positioning structure.

In one embodiment, in the liquid crystal display device, a structure of the first positioning structure is different from a structure of the second positioning structure, and the anti-positioning structure on the optical film is arranged corresponding to at least one of the first positioning structure and the second positioning structure.

According to the Above Embodiment:

The disclosure provides a backlight module and a liquid crystal display device. The backlight module comprises a back plate, a flexible circuit board, at least one light-emitting chip, and an optical film. The flexible circuit board is disposed on one side of the back plate. The light-emitting chip is disposed on one side of the flexible circuit board away from the back plate. The optical film is disposed on one side of the light-emitting chip away from the flexible circuit board. The backlight module further comprises at least one positioning structure, the positioning structure is disposed on one side of the flexible circuit board away from the back plate, and the positioning structure is disposed outside an area corresponding to the light-emitting chip. A height of the positioning structure is greater than or equal to a maximum thickness of the optical film, and an anti-positioning structure is disposed in the optical film corresponding to the positioning structure. In this disclosure, the positioning structure is disposed on one side of a flexible circuit board away from a back plate. The positioning structure is arranged outside a corresponding area of the light-emitting chip, and an anti-positioning structure is disposed in the optical film. The positioning structure disposed on the side of the light-emitting chip can be matched with the anti-positioning structure, and the optical film can be positioned and fixed. In this disclosure, it is only necessary to arrange a positioning structure on the side of the light-emitting chip, without increasing the width of the frame of the backlight module, so that the positioning of the optical film is achieved and the width of the frame of the backlight module is reduced.

In the above embodiments, the description of each embodiment has its own emphasis. For the parts that are not described in detail in a certain embodiment, please refer to the relevant description of other embodiments.

The backlight module and the liquid crystal display device provided by this disclosure are described in detail as above-mentioned. In this disclosure, specific embodiments are used to illustrate the principles and implementation of the application. The description of the above embodiments is only used to understand the method and features of this disclosure. Simultaneously, for those of ordinary skill in the art, according to the features of the disclosure, there will be modifications in the specific embodiments and the scope of disclosure. In summary, the description of the specification should not be interpreted as a limitation to this disclosure.

What is claimed is:

1. A backlight module, comprising:
a back plate;
a flexible circuit board disposed in one side of the back plate;
a plurality of light-emitting chips arranged in an array and disposed in one side of the flexible circuit board away from the back plate; and
an optical film disposed at one side of the array of the light-emitting chips away from the flexible circuit board;
wherein the backlight module further comprises a plurality of positioning structures, the positioning structures are disposed in one side of the flexible circuit board away from the back plate, and the positioning structures are disposed outside an area corresponding to the light-emitting chips, a height of at least one of the positioning structures is greater than or equal to a maximum thickness of the optical film, and a plurality of anti-positioning structures are disposed in the optical film corresponding to the positioning structures,
wherein the positioning structures include a positioning column, and the anti-positioning structures include a through hole corresponding to the positioning column, wherein the through hole is configured to receive and mate with the positioning column,
wherein the backlight module further includes at least one reflective structure, the reflective structure is disposed in one side of the flexible circuit board away from the back plate, the reflective structure is disposed between the light-emitting chips, a height of the reflective structure is greater than a height of each of the light-emitting chips, and the height of the reflective structure is less than or equal to a minimum thickness of the optical film.

2. The backlight module according to claim 1, wherein the backlight module includes a first area, a second area, a third area and a fourth area disposed around the area corresponding to the light-emitting chips; and
wherein the positioning structures include a first positioning structure and a second positioning structure, the first positioning structure is disposed in one of the first area, the second area, the third area and the fourth area, the second positioning structure is in another one of the first area, the second area, the third area and the fourth area.

3. The backlight module according to claim 2, wherein the backlight module includes a first corner area at a junction of the first area and the second area, a second corner area at a junction of the first area and the third area, a third corner area at a junction of the second area and the fourth area, a fourth corner area at a junction of the third area and the fourth area, the positioning structures are disposed in at least one of the first corner area, the second corner area, the third corner area and the fourth corner area.

4. The backlight module according to claim 3, wherein the first positioning structure is disposed in one of the first corner area, the second corner area, the third corner area and the fourth corner area, and the second positioning structure is disposed in another one of the first corner area, the second corner area, the third corner area, and the fourth corner area.

5. The backlight module according to claim 3, wherein the first positioning structure is disposed in one of the first corner area, the second corner area, the third corner area and the fourth corner area, and the second positioning structure is disposed in a non-junctional area of the first area, the second area, the third area and the fourth area.

6. The backlight module according to claim 5, wherein the anti-positioning structures include a first anti-positioning structure and a second anti-positioning structure, the optical film includes a prism sheet and a diffusion sheet, the first anti-positioning structure is disposed in the prism sheet, the second anti-positioning structure is disposed in the diffusion sheet, the first anti-positioning structure corresponds to the first positioning structure and the second positioning structure, the second anti-positioning structure corresponds to the second positioning structure; or the first anti-positioning structure corresponds to the first positioning structure and the second positioning structure, the second anti-positioning structure corresponds to the first positioning structure and the second positioning structure.

7. The backlight module according to claim 2, wherein a structure of the first positioning structure is different from a structure of the second positioning structure, and the anti-positioning structure on the optical film is arranged corresponding to at least one of the first positioning structure and the second positioning structure.

8. The backlight module according to claim 2, wherein the optical film includes a color conversion film, a light homogenization film, a prism sheet and a diffusion sheet, and the color conversion film is disposed between the array of the light-emitting chips and the light homogenization film, the prism sheet is disposed in the side of the light homogenization film away from the color conversion film, and the diffusion sheet is disposed in one side of the prism sheet away from the light homogenization film.

9. The backlight module according to claim 1, wherein materials of the positioning structures include silica gel and silicon dioxide.

10. The backlight module according to claim 1, wherein the reflective structure is disposed in an array pattern formed of columns and rows interleaved between the light-emitting chips, a difference between a height of a portion of the reflective structure at each junction of rows and columns of the array pattern of the reflective structure and heights of other portions of the reflective structure ranges from 0.05 mm to 0.08 mm.

11. The backlight module according to claim 1, wherein the reflective structure includes a first portion disposed between the light-emitting chips and a second portion disposed outside the area corresponding to the light-emitting chips, and the second portion of the reflective structure is disposed between the positioning structures and filled with gaps between adjacent positioning structures.

12. A liquid crystal display device, comprising a liquid crystal display panel and a backlight module, wherein the backlight module comprises:

a back plate;

a flexible circuit board disposed in one side of the back plate;

a plurality of light-emitting chips arranged in an array and disposed in one side of the flexible circuit board away from the back plate; and an optical film disposed at one side of the array of the light-emitting chips away from the flexible circuit board;

wherein the backlight module further comprises a plurality of positioning structures, the positioning structures are disposed in one side of the flexible circuit board away from the back plate, and the positioning structures are disposed outside an area corresponding to the light-emitting chips, a height of at least one of the positioning structures is greater than or equal to a maximum thickness of the optical film, and a plurality of anti-positioning structures are disposed in the optical film corresponding to the positioning structures, wherein the positioning structures include a positioning column, and the anti-positioning structures include a through hole corresponding to the positioning column, wherein the through hole is configured to receive and mate with the positioning column, wherein the positioning structures include a first positioning structure and a second positioning structure wherein the anti-positioning structures include a first anti-positioning structure and a second anti-positioning structure, the optical film includes a prism sheet and a diffusion sheet, the first anti-positioning structure is disposed in the prism sheet, the second anti-positioning structure is disposed in the diffusion sheet, the first anti-positioning structure corresponds to the first positioning structure and the second positioning structure, the second anti-positioning structure corresponds to the second positioning structure; or the first anti-positioning structure corresponds to the first positioning structure and the second positioning structure, the second anti-positioning structure corresponds to the first positioning structure and the second positioning structure.

13. The liquid crystal display device according to claim 12, wherein the backlight module includes a first area, a second area, a third area and a fourth area disposed around the area corresponding to the light-emitting chips; and wherein the first positioning structure is disposed in one of the first area, the second area, the third area and the fourth area, the second positioning structure is disposed in another one of the first area, the second area, the third area and the fourth area.

14. The liquid crystal display device according to claim 13, wherein the backlight module includes a first corner area at a junction of the first area and the second area, a second corner area at a junction of the first area and the third area, a third corner area at a junction of the second area and the fourth area, a fourth corner area at a junction of the third area and the fourth area, the positioning structures are disposed in at least one of the first corner area, the second corner area, the third corner area and the fourth corner area.

15. The liquid crystal display device according to claim 14, wherein the first positioning structure is disposed in one of the first corner area, the second corner area, the third corner area and the fourth corner area, and the second positioning structure is disposed in another one of the first corner area, the second corner area, the third corner area, and the fourth corner area.

16. The liquid crystal display device according to claim 14, wherein the first positioning structure is disposed in one of the first corner area, the second corner area, the third corner area and the fourth corner area, and the second positioning structure is disposed in a non-junctional area of the first area, the second area, the third area and the fourth area.

17. The liquid crystal display device according to claim 13, wherein a structure of the first positioning structure is different from a structure of the second positioning structure, and the anti-positioning structure on the optical film is arranged corresponding to at least one of the first positioning structure and the second positioning structure.

* * * * *